(12) United States Patent
Pratt et al.

(10) Patent No.: US 11,792,657 B2
(45) Date of Patent: Oct. 17, 2023

(54) SYSTEM FOR ORCHESTRATION OF TEMPORARY OR MODULAR NETWORK RESOURCES

(71) Applicant: AT&T Intellectual Property I, L.P., Atlanta, GA (US)

(72) Inventors: James Pratt, Round Rock, TX (US); Yupeng Jia, Austin, TX (US); Eric Zavesky, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 311 days.

(21) Appl. No.: 17/203,947

(22) Filed: Mar. 17, 2021

(65) Prior Publication Data

US 2022/0303787 A1    Sep. 22, 2022

(51) Int. Cl.
*H04W 16/28* (2009.01)
*H04W 64/00* (2009.01)
*G06N 3/00* (2023.01)

(52) U.S. Cl.
CPC ........... *H04W 16/28* (2013.01); *H04W 64/00* (2013.01); *G06N 3/00* (2013.01)

(58) Field of Classification Search
CPC ......... H04W 16/28; H04W 64/00; G06N 3/00
See application file for complete search history.

(56) References Cited

U.S. PATENT DOCUMENTS 10,798,592 B2   10/2020  Decuir et al.
2020/0404516 A1  12/2020  Decuir et al.

*Primary Examiner* — Natasha W Cosme
(74) *Attorney, Agent, or Firm* — GUNTIN & GUST, PLC; Matthew Tropper

(57) ABSTRACT

A computer-implemented method includes receiving information associated with a plurality of user equipment, wherein the information comprises location information for each of the plurality of user equipment and receiving information associated with a plurality of base stations. The computer-implemented method further includes analyzing the information associated with the plurality of user equipment or the information associated with the plurality of base stations. The computer-implemented method further includes in response to the analysis, detecting a trigger, wherein the trigger comprises reaching one or more thresholds. The computer-implemented method further includes based on the trigger, sending an alert to one or more of the plurality of user equipment or orchestrating movement of a component of each of the plurality of base stations.

20 Claims, 7 Drawing Sheets

200

SYSTEM FOR ORCHESTRATION OF TEMPORARY OR MODULAR NETWORK RESOURCES

TECHNICAL FIELD

This disclosure is directed to a system and method for network resource management, and, more specifically, to managing network resource movement or redirection to accommodate planned or unplanned network traffic changes.

BACKGROUND

Service providers are able to provide a broad array of network-based services that include video, telephone, cellular, data and other services, which require extensive network infrastructure. The wide adoption of mobile devices along with ubiquitous cellular data coverage has resulted in the unprecedented growth of mobile applications that are dependent on always-accessible wireless networking. The growth in the use of mobile applications has placed strains on the network infrastructure. A strained network infrastructure may result in dropped calls and poor communication, which may cause user dissatisfaction.

This background information is provided to reveal information believed by the applicant to be of possible relevance. No admission is necessarily intended, nor should be construed, that any of the preceding information constitutes prior art.

SUMMARY

Disclosed herein is a system having one or more processors and a memory coupled with the one or more processors. The one or more processors effectuate operations including receiving information associated with a plurality of user equipment, wherein the information comprises location information for each of the plurality of user equipment. The one or more processors further effectuate operations including receiving information associated with a plurality of base stations in proximity to the plurality of user equipment. The one or more processors further effectuate operations including analyzing the information associated with the plurality of user equipment or the information associated with the plurality of base stations, wherein the analysis of the information associated with the plurality of user equipment or the information associated with the plurality of base stations is historical or near real-time information that uses artificial intelligence. The one or more processors further effectuate operations including in response to the analysis, detecting a trigger, wherein the trigger comprises reaching one or more thresholds associated with the information associated with the plurality of user equipment or the information associated with the plurality of base stations. The one or more processors further effectuate operations including based on the trigger, sending an alert to one or more of the plurality of user equipment, wherein the alert indicates a modification of a configuration of an antenna of the one or more of the plurality of user equipment or orchestrating movement of a component of each of the plurality of base stations.

Disclosed herein is a computer-implemented method. The computer-implemented method includes receiving information associated with a plurality of user equipment, wherein the information comprises location information for each of the plurality of user equipment. The computer-implemented method further includes receiving information associated with a plurality of base stations in proximity to the plurality of user equipment. The computer-implemented method further includes analyzing the information associated with the plurality of user equipment or the information associated with the plurality of base stations, wherein the analysis of the information associated with the plurality of user equipment or the information associated with the plurality of base stations is historical or near real-time information that uses artificial intelligence. The computer-implemented method further includes in response to the analysis, detecting a trigger, wherein the trigger comprises reaching one or more thresholds associated with the information associated with the plurality of user equipment or the information associated with the plurality of base stations. The computer-implemented method further includes based on the trigger, sending an alert to one or more of the plurality of user equipment, wherein the alert indicates a modification of a configuration of an antenna of the one or more of the plurality of user equipment or orchestrating movement of a component of each of the plurality of base stations.

Disclosed herein is a computer-readable storage medium storing executable instructions that when executed by a computing device cause said computing device to effectuate operations including receiving information associated with a plurality of user equipment, wherein the information comprises location information for each of the plurality of user equipment. Operations further include receiving information associated with a plurality of base stations in proximity to the plurality of user equipment. Operations further include analyzing the information associated with the plurality of user equipment or the information associated with the plurality of base stations, wherein the analysis of the information associated with the plurality of user equipment or the information associated with the plurality of base stations is historical or near real-time information that uses artificial intelligence. Operations further include in response to the analysis, detecting a trigger, wherein the trigger comprises reaching one or more thresholds associated with the information associated with the plurality of user equipment or the information associated with the plurality of base stations. Operations further include based on the trigger, sending an alert to one or more of the plurality of user equipment, wherein the alert indicates a modification of a configuration of an antenna of the one or more of the plurality of user equipment or orchestrating movement of a component of each of the plurality of base stations.

BRIEF DESCRIPTION OF THE DRAWINGS

Aspects of the herein described telecommunications network and systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

With the introduction of new telecommunications technologies (e.g., LTE, 5G, 6G, Wi-Fi 6, etc.) improving a telecommunications network infrastructure to provide new or additional services to users is essential. Accordingly, telecommunications service providers spend a large amount of effort deciding what regions to prioritize for the placement of cell sites and other network infrastructure because cell towers and other network infrastructure operations are static in nature (e.g., difficulty or incapable of changing orientation or physical location). The static nature of cell sites and other network infrastructure complicates managing permanent or temporary network demand spikes (e.g., seasonal demand, events, emergencies, new or increased customer demand at a given location or from a unplanned direction, etc.) without providing additional cell towers and other network infrastructure to meet the increased demand. Accordingly, because cell towers and other network infrastructure lack the flexibility to adjust to increases in demand, planned or unplanned, the telecommunications service providers may not provide services to customers in a satisfactory manner.

Accordingly, providing cell towers and other network infrastructure capable of changing physical location or orientation to accommodate permanent or temporary network demand spikes may be beneficial. By detecting and mitigating attacks at or near an entry point to the telecommunications network, mitigation of attacks on a telecommunications network may be achieved.

The present disclosure includes a system that orchestrates network resource movement, both routing and physical infrastructure, as well as redirection. Instead of utilizing a static telecommunications infrastructure, the system intelligently may use movement and resource splitting within an infrastructure as a backbone (IAB), as well as providing intelligent navigation, intelligent positioning of cell towers, or other network infrastructure based on coverage or accessibility. The system may also provide modular components that may be added to existing cell towers and other network infrastructure that may be used to accommodate permanent or temporary network demand spikes.

Figure 1:
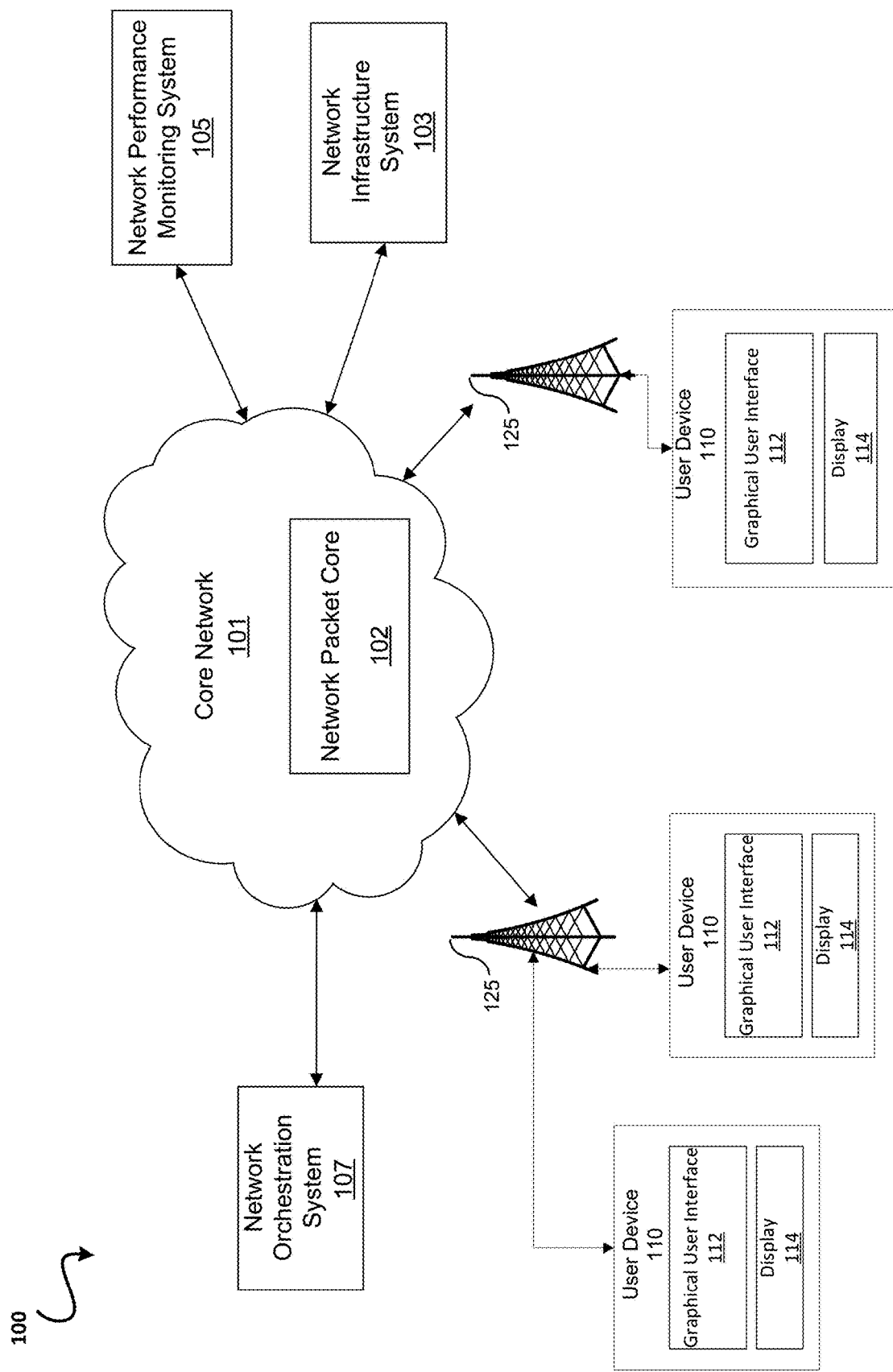
FIG. 1 is a block diagram of an exemplary operating environment in accordance with the present disclosure.

FIG. 1 illustrates an example telecommunication system 100 that may be utilized to facilitate operational management processes according to an exemplary embodiment of the present disclosure. The telecommunication system 100 may include a telecommunications network 101, a packet core network 102, a network infrastructure system 103, a network performance monitoring system 105, a network orchestration system 107, or user equipment (UE) 110. As shown in FIG. 1, UE 110 may request a service, execute an application, perform an operation, provide telephony services, messaging services, video services, or the like. As depicted in FIG. 1, UE 110 may comprise any appropriate type of user equipment, such as, for example, a tablet, personal computer, a laptop computer, or a mobile device, or the like. The UE 110 may include a display 114 and a graphical user interface 112.

UE 110 may gain access to the telecommunications network 101 via any appropriate mechanism. For example, as depicted in FIG. 1, access to the telecommunications network 101 may be provided via the packet core 102 and cellular infrastructure (e.g., radio access technology 125 (e.g., an LTE RAN, 5G RAN, etc.), Wi-Fi infrastructure, hot spots, or the like, or any appropriate combination thereof. The packet core 102 may be for example, an Evolved Packet Core (EPC) or Common BackBone (CBB).

The network infrastructure system 103 may be a system that collects and stores network infrastructure plans. The network infrastructure plans may include locations and configurations for one or more network nodes (e.g., one or more cell sites, one or more base stations or network components). For example, network infrastructure plans may indicate that the one or more network nodes are installed on top of a building or structure (e.g., residential or office). The one or more network nodes may be installed using a rail, wheel, or other type of movable assembly thereby allowing the one or more network nodes to be movable after installation on top of the building or structure. The configuration of the one or more network nodes may be based on, for example, technologies to be implemented (e.g., 5G NR, LTE, NB-IoT, UMTS, GSM, CDMA, etc.), antenna models, antenna heights, orientation, azimuth, or tilt angles, etc.

The network performance monitoring system 105 may collect network statistics (e.g., average signal strength, location, demand, orientation, etc.) from one or more base stations (e.g. cell sites) or network components at a given location. The network statistics collected may be utilized to determine whether the given location is underserved, sufficiently served, or overserved. The network performance monitoring system 105 may also collect customer data related to mobile application usage, mobile device type, or model, etc. The network performance monitoring system 105 may utilize the network statistics and customer data to generate network performance data for the given location. The network performance monitoring system 105 may store the network performance data in real-time or over time (e.g., historical data).

The network orchestration system 107 may be a computing device (e.g., a server), which may be used to determine network infrastructure adjustments based on network infrastructure plans received from the network infrastructure system 103 and network performance data received from the network performance monitoring system 105 for a given location. The network orchestration system 107 may utilize network node locations, network performance data to adjust or supplement the network infrastructure to meet changes in demand at the given location. For example, demand at the given location may increase due to an event (e.g., a conference, concert, sporting event, pop up shop, etc.) occurring at the given location. To adjust the network infrastructure, the network orchestration system 107 may communicate with network node to change an orientation of the network node to be directed to locations of increased demand. In instances where changes to the orientation of network nodes are not possible or not sufficient to meet the increased demand, additional infrastructure may be added to the current network infrastructures to supplement the current functionality of the current network infrastructure. For example, the additional infrastructure may include modular network resources which may be network nodes of different capacities and functionality (e.g. power, throughput, etc.) to dynamically connect to available ports of the network infrastructure at the given location. The modular network resources may include a drone based node that may attach itself to a network node, a car based node that has guidance management for where to drive to provide additional coverage, or a ship based node that has guidance management for where to travel to provide additional coverage.

When determining how to adjust the network infrastructure, the network orchestration system 107 may utilize machine learning to train the network orchestration system 107 to make better adjustments or anticipate adjustments to a given network node. The machine learning may incorporate reinforcement learning-based tuning. The machine learning may utilize historical patterns as initial fit, as well as advanced machine learning techniques (e.g., generative adversarial networks) to propose hybrid structures and evaluate alternative adjustments due to permanent or temporary network demand spikes.

The network orchestration system 107 may use the network infrastructure plans to maintain an automated inventory of available resources and potential locations using location estimation models (e.g., where people are, where potential equipment could go) or a collection of adjacent equipment (e.g., which nodes are fixed, which nodes can be moved, which nodes are attached to mobile resources (e.g., drones, ships, vehicles, etc.)) have AI-based planning (but also interoperable for operators).

The network orchestration system 107 may also provide network resource monitoring, update to node plane orientation, and provide quality of service allocations that are dynamic based on instant application needs (e.g. an immediate need for ultra-low latency interactions with other users or devices or high bandwidth transfers of complex virtual objects or visualizations), as well as resource request (e.g., a persistent need change where one area becomes a hotspot). The network orchestration system 107 may also execute orchestration and real-time changes of network topology or port usage for active changes based on ephemeral requirements (e.g., first responder, change of network throughput).

The network orchestration system 107 may perform adjustments to a given network node in telecommunications network 101 to account for planned or unplanned changes in demand. For example, the network orchestration system 107 may perform adjustments for high speed but ephemeral network needs (e.g., a first responder response to an emergency), medicine-in-the-field for teleoperations (e.g., remote teleoperations), or temporary hot spot needs for equipment used in down or low-connectivity areas due to a natural disaster. Additionally, the network orchestration system 107 may perform adjustments for positioning and tracking a ship or platform in ocean or space. Additionally, the network orchestration system 107 may perform adjustments following a high/burst event for private communication (e.g. video broadcast at an event). Additionally, the network orchestration system 107 may perform adjustments in response to a gradual migration of network resources.

Figure 2:
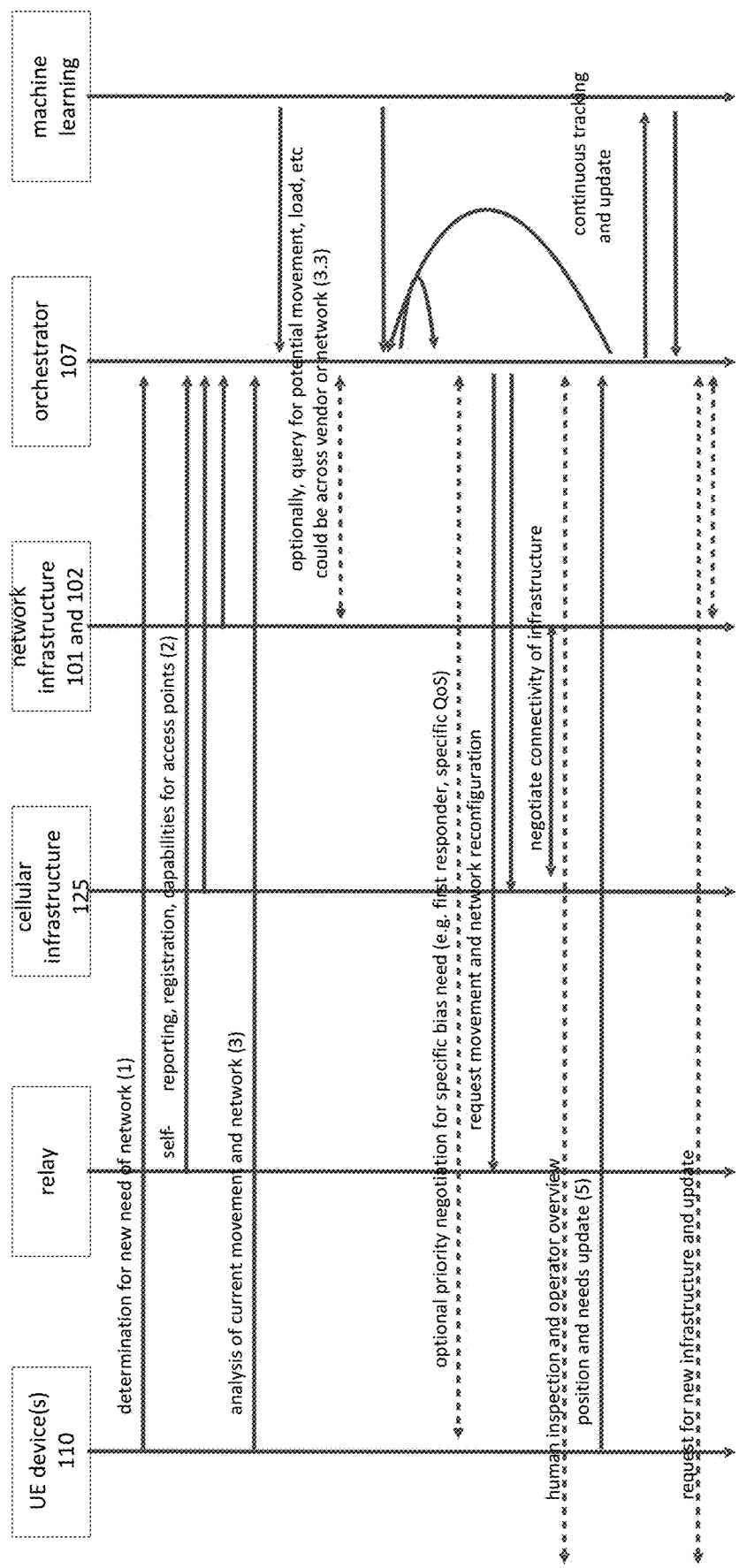
FIG. 2 is a flowchart of an exemplary method of operation for the architecture described in FIG. 1.

FIG. 2 illustrates a method of orchestration of temporary and modular network resources within a telecommunications network according one or more embodiments. A network orchestration system 107 may determine permanent or temporary network demand for UEs 110 at a given location. A relay node within the network 101 may provide self-reporting, registration, and capabilities of access points to the network orchestration system 107. The relay node may be, for example, a simplified version of the radio, a radio tower, or a low maintenance radio. The network orchestration system 107 may analyze UE movement, cellular infrastructure (e.g., network nodes), or network performance at a given location.

The network orchestration system 107 may perform further analysis of the network 101 at the given location based on historical network demand patterns determined from machine learning, which may be cyclical or ephemeral. The network orchestration system 107 may query a network infrastructure (e.g., network 101 or core network 102) for potential movement of all connected UEs, load, and potential movement of the radio or towers of the cellular infrastructure 125 in an area, etc., which could include queries to other networks connected to network 101. The network orchestration system 107 may also perform a local fit within a context. Here, a local fit may be an opportunistic and short-term or narrow-space optimal configuration of the radio or towers with respect to the network needs. A local fit is in contrast to a larger global optimum that may traditionally drive network orchestration and is usually maintained for only short periods of time, both because the local optimum may change quickly and because it is not a global optimum. The network orchestration system 107 may also perform priority negotiation for a specific need or event (e.g. first responder or specific QoS). Based on the analysis by the network orchestration system 107, the network orchestration system 107 may conduct a network reconfiguration by instructing one or more relays or one or more adjust in orientation toward a direction at the given location experiencing an increase network demand. In addition, based on the analysis by the network orchestration system 107, the network orchestration system 107 may further conduct a network reconfiguration by dispatching a modular network resource(s), which may connect to a network node at the given location to address a permanent or temporary increase network demand. The cellular infrastructure 125 and network infrastructure may negotiate connectivity. For example, a backhaul may be connected to the cellular infrastructure 125, but after adding one or more modular resources (e.g. a drone with additional radios, a mesh network connection to another service provider's network, a short-wave microwave repeater signal, or a secondary connection to a satellite network), the cellular infrastructure 125 may negotiate to use the modular resources (e.g. the satellite network) for receipt of a bandwidth multi-cast signal (e.g. an 8 k video stream) and utilize the backhaul for local data or voice transmission. The network orchestration system 107 may receive inspection data or operator data related to UE operations (e.g., applications or software running on the UE 110) and demand. For example, the network orchestration system 107 may instruct the cellular infrastructure 125 to send signaling codes to the UE device 110 to register or de-register to different radios or towers in the cellular infrastructure 125 that correspond to planned actions for better UE performance. In another example, an action from the network orchestration system 107 for a first portion of the cellular infrastructure (e.g., a radio or tower) could be rotating 135 degrees to handle UEs in a different area such that a second portion of the cellular infrastructure (e.g., a different radio or tower from the first radio or tower) may become an optimal signal source for a UE device 110. Thus, the network orchestration system 107 sends action information to both first and second radios or towers 125 to register or de-register a specific UE in the area. The network orchestration system 107 may apply machine learning (e.g., algorithms that build a model based on training data in order to make predictions or decisions without being programmed to do so) to the received inspection data or operator data to train the network orchestration system 107 to make better adjustments or anticipate adjustments to a given network node. The network orchestration system 107 may receive additional inspection data or operator data (e.g., data related to past network adjustments to the cellular network infrastructure 125 performed by a technician or the network orchestration system 107, or data related to general network adjustments) to conduct network node adjustments or to conduct machine learning.

Figure 3:
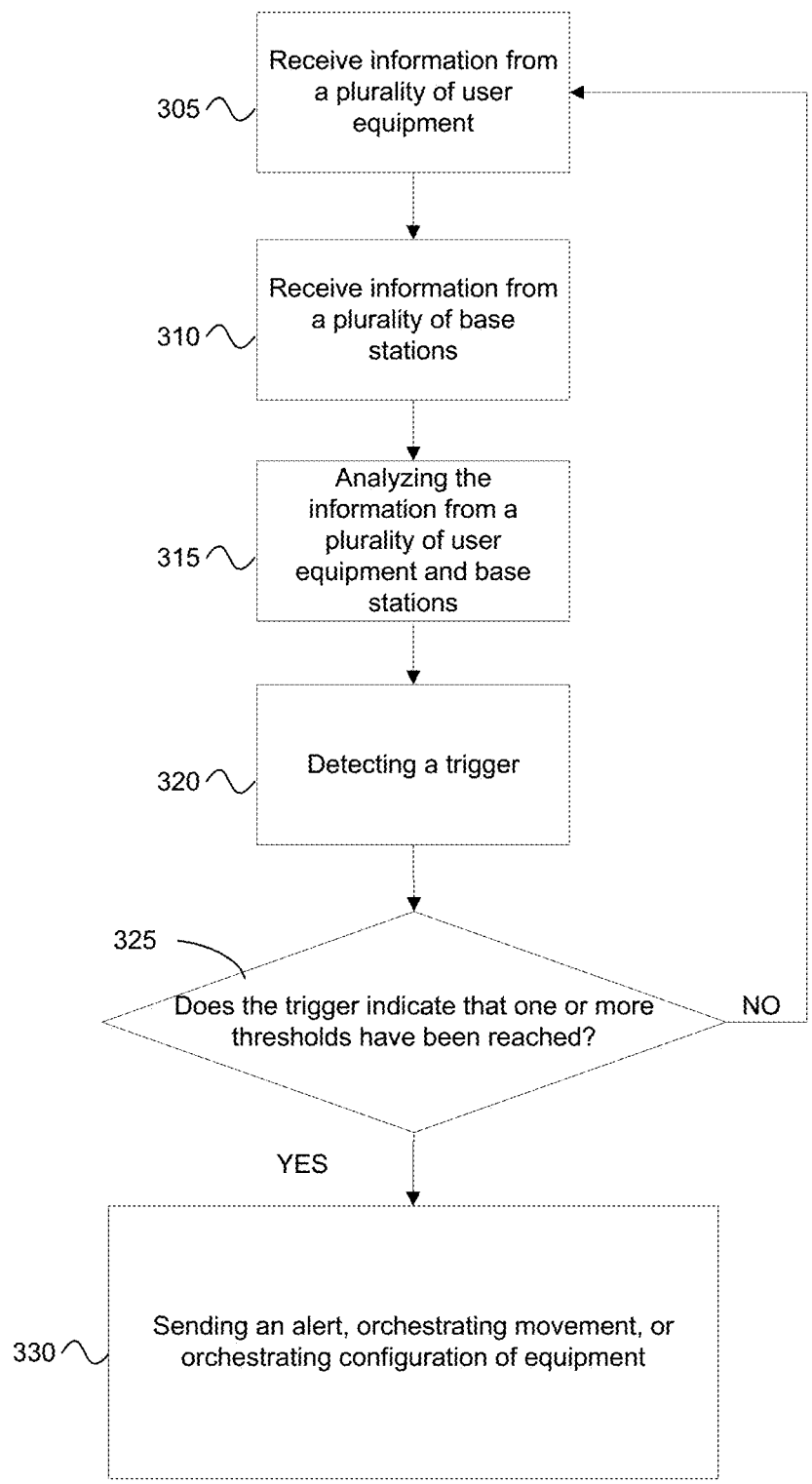
FIG. 3 is a flowchart of an exemplary method of operation for the architecture described in FIG. 1.

An exemplary operational flowchart in accordance with a method of the present disclosure is illustrated in FIG. 3, which may be utilized for orchestration of temporary and modular network resources within a telecommunications network according one or more embodiments. At block 305, network orchestration system 107 may receive information from a plurality of UE 110. For example, the information received from the plurality of UE may include geographical location information, proximity information with respect to other UE 110, wireless standards (e.g., Wi-Fi, LTE, NR, or Bluetooth), antenna types, UE type, UE model, operating system for the UE, minimum throughput for each of the plurality of UE 110, application information for each UE 110 (e.g., type of application running on the UE (e.g., audio, video, email, etc.), quality of service requirement of application, minimum bandwidth threshold or preferred bandwidth threshold while using each application on the UE). At block 310, network orchestration system 107 may receive information from a plurality of network nodes. For example, the information may include a type for each of the plurality of network nodes (e.g., base stations), available bandwidth of each of the plurality of network nodes, location for each of the plurality of network nodes, radio coverage of each of the plurality of network nodes, component movement capability of each of the plurality of network nodes, network node movement capability for each of the plurality of network nodes, in which a subset of the plurality of network nodes may include drones or internet of things (IoT) devices.

At block 315, the network orchestration system 107 may analyze the information received from the plurality of UE 110 or the plurality of network nodes to determine a demand. At block 320, the network orchestration system 107 may detect a trigger indicating reaching one or more thresholds associated with the information associated with the plurality of UE 110 or the plurality of network nodes. The one or more thresholds may be based on permanent or temporary network demand spikes.

At block 325, the network orchestration system 107 may determine whether the one or more thresholds have been reached. If the one or more thresholds have been reached, the method proceeds to block 330, where the network orchestration system 107 may send an alert to one or more of the plurality of UE 110 indicating a modification of a configuration of an antenna of the one or more of the plurality of UE 110 or orchestrate movement of a component of each of the plurality of network nodes, movement of each of the plurality of network nodes, or configuration of an antenna of the one or more of the plurality of UE 110. If the one or more thresholds have not been reached, the method returns to block 305.

Accordingly, the present disclosure provides a system to orchestrate network resource movement, for routing or physical infrastructure, as well as redirection. The system may use movement and resource splits among infrastructure as a backbone and relays, including navigation and positioning of radios with respect to coverage and accessibility. The system may further utilize modular components usage via recruitment of in-place static ports and mobile or variant radio connectors. The system may further provide analytics for small events (emergency response), personalized needs, private needs, etc.

The system may determine network needs based on user equipment at a given location and determine an available radio catalog and network access points. The determination may be based on static radios and resource access points, available actors (e.g. movement capabilities) that can modularize the components of radio, necessary network resources (bandwidth, available spectrum, power), etc.

The system may generate and provide analytics for movement and radio coverage including, for example, bootstrap analysis by comparing against historical examples (e.g., mapping need to context (e.g. aerial, over-sea, crowded, urban, etc.)). The system may also provide a coarse orchestration plan (e.g., target location coverage, modular needs, user needs). The analytics may account for ephemeral network needs, cyclic, or periodic. The analytics may be used to determine available resource movements (e.g. slight, servo-based radio plane rotation, etc.) or resource connectivity options (e.g., drone, vehicle, boat, etc.). The analytics may be used to determine a local model fit or optimization for a current context, which may be dependent on either manual input or automated/historical determinations. The analytics may be optimized for speed, throughput, cost, etc. The optimization may be customer or need specific, as well as bias orchestration choices.

The system may orchestrate separation or joining of different components. The separation or joining of different components may involve using non-radio components (e.g. drones, IoT, moving servos, etc.), using separate radio components, attaching components to infrastructure where necessary (e.g., trigger relay or IAB configurations). The separation or joining of different components may further involve mounting and navigating radio components to locations, establishing local state control for components, as well as tracking other network components. The system may provide movement plans or location plans for inspection (e.g. a heatmap of planned or current coverage, as well as network resources).

The system may provide continuous tracking and update of distribution including high frequency logging of performance and action choice for subsequent learning, local adaptation of strategy with existing components, or one or more alternate radio methods (e.g. WiFi, cell, Bluetooth, satellite, infrared, etc.) may be utilized without requiring additional physical components. The system may provide post-mortem learning of events and structures including rebuild models for real-time ("continuous tracking") or preemptive movement ("orchestration") system actions, as well as intelligently request additional hardware or deployment to defray future needs automatically.

Accordingly, the system disclosed herein provides an orchestration that arranges dynamic network structures, like UAV-based or ocean-of-things deployments for ephemeral and needs-based placement of network structures. The system disclosed herein may be modular in order to allow a more agile response to resource needs and defray some costs by reusing pre-built (but not static/fixed) infrastructure buildout. The system disclosed herein may accommodate both short-term network spikes (e.g. high bandwidth video need by small cluster of UEs) as well as medium-term traffic changes (e.g. move to urbanized video instead of mostly cell/text communications) with minimal operator inspection or re-planning. The system disclosed herein may provide a faster network-driven response to disaster situations. The system disclosed herein may utilize long-term pattern-based storage and learning of utilized network configuration and topology, which may be used as generalized practices (e.g. tops of buildings are not good for directional radios) that can be utilized elsewhere by operators or automation in resource orchestration.

Figure 4:
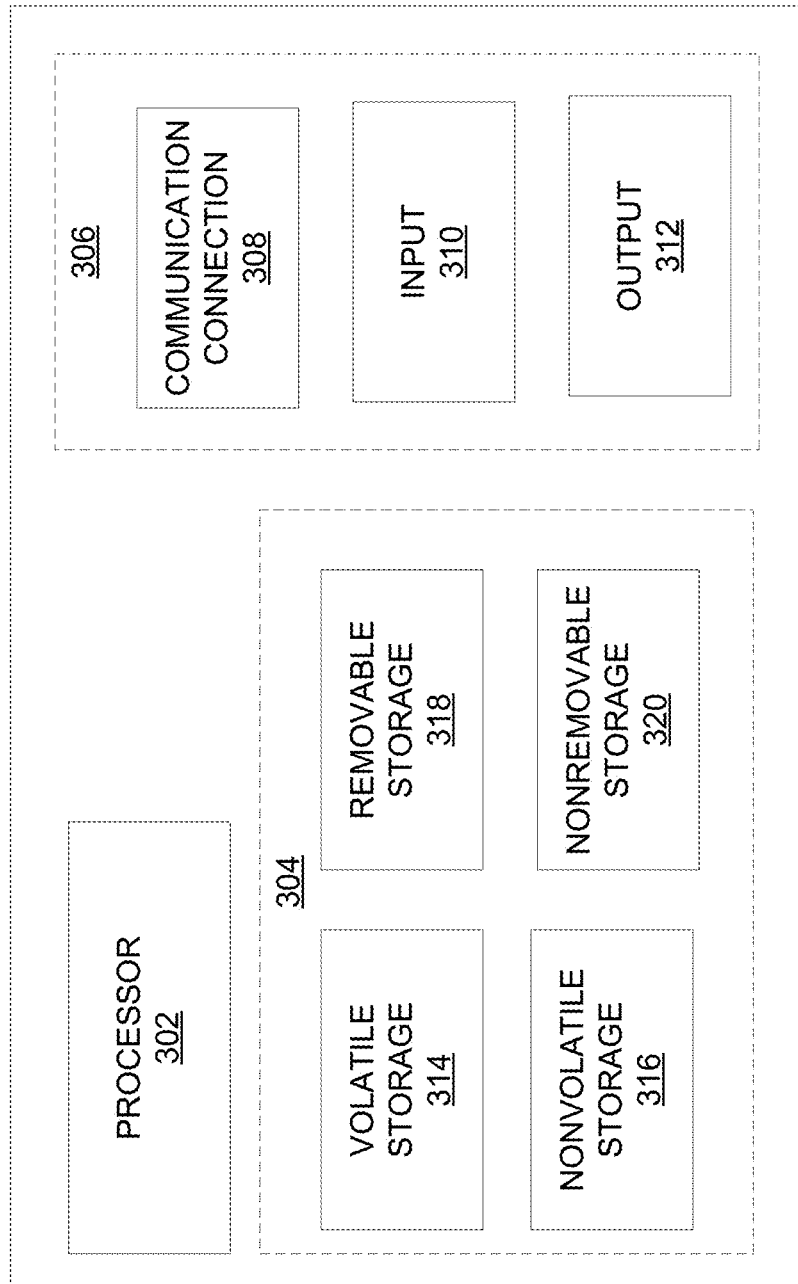
FIG. 4 is a schematic of an exemplary network device.

FIG. 4 is a block diagram of network device 300 that may be associated with equipment of FIG. 1 through FIG. 3. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller, or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 4) to allow communications therebetween. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
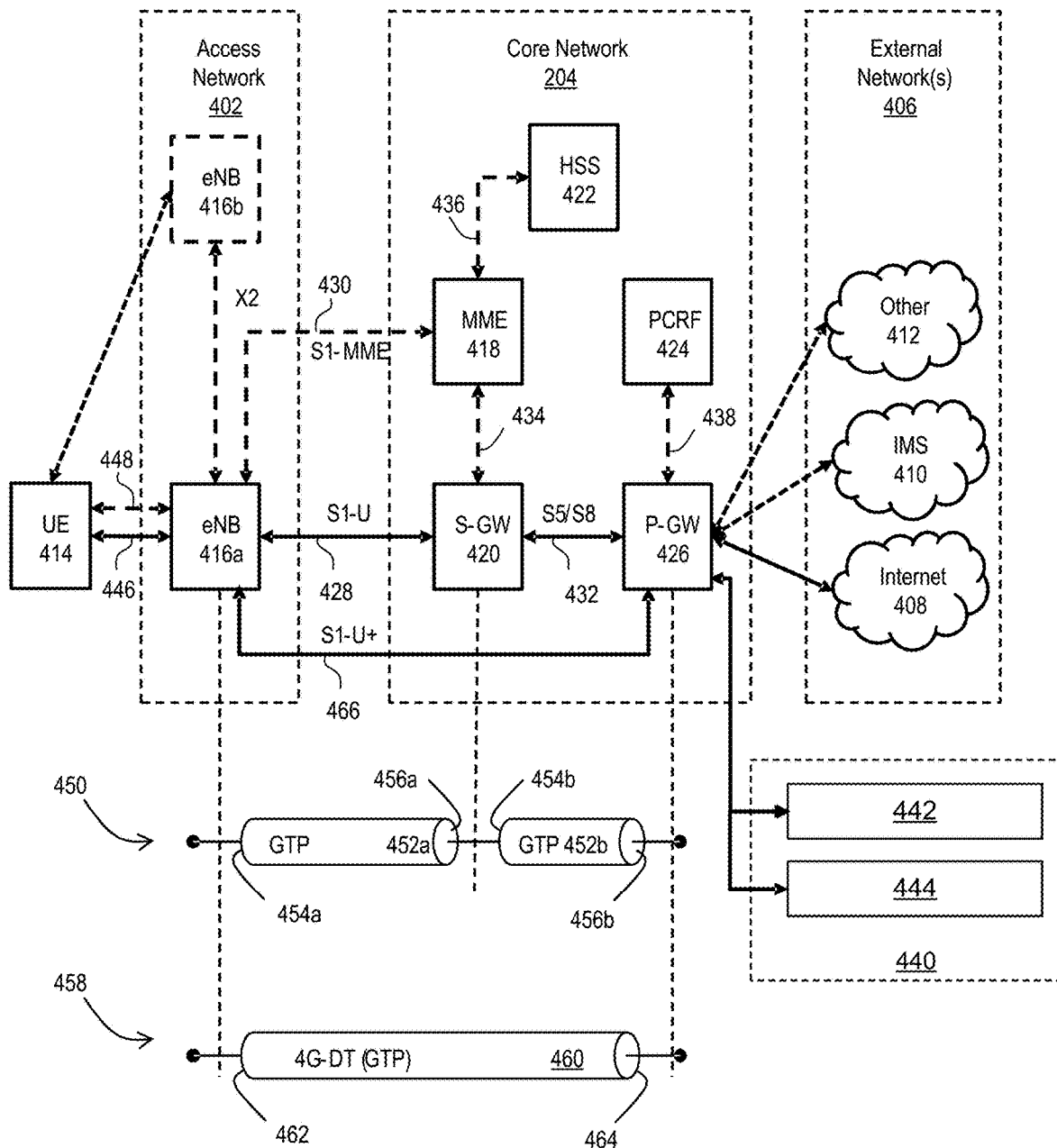
FIG. 5 depicts an exemplary communication system that provide wireless telecommunication services over wireless communication networks with which edge computing node may communicate.

FIG. 5 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416*a*, 416*b*. During network operations, at least one base station 416 communicates directly with UE 414. Base station 416 can be an evolved Node B (eNodeB), with which UE 414 communicates over the air and wirelessly. UEs 414 can include, without limitation, wireless devices, e.g., satellite communication systems, portable digital assistants (PDAs), laptop computers, tablet devices, Internet-of-things (IoT) devices, and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media, and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths or interfaces are terms that can include features, methodologies, or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416*a* to second eNB 416*b* as may be the result of UE 414 moving from one area of coverage, e.g., cell, to another. SGW 420 can also terminate a downlink data path, e.g., from external network 406 to UE 414 in an idle state and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416*a*.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416*a* and PGW 426. Notably, S1-U+ path/interface does not include SGW 420, a node that is otherwise instrumental in configuring or managing packet forwarding between eNB 416*a* and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory or disk drive. It is understood that storage device 440 can include registers suitable for storing address values. Alternatively, or in addition, storage device 440 can be separate from PGW 426, for example, as an external hard drive, a flash drive, or network storage.

Storage device 440 selectively stores one or more values relevant to the forwarding of packet data. For example, storage device 440 can store identities or addresses of network entities, such as any of network nodes 418, 420, 422, 424, and 426, eNBs 416 or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, or other data structures generally well understood and suitable for maintaining or otherwise manipulate forwarding addresses on a per bearer basis.

It should be noted that access network 402 and core network 404 are illustrated in a simplified block diagram in FIG. 5. In other words, either or both of access network 402 and the core network 404 can include additional network elements that are not shown, such as various routers, switches, and controllers. In addition, although FIG. 5 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416*a*, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416*a*, a second portion (e.g., an S1 data bearer 428) between eNB 416*a* and SGW 420, and a third portion (e.g., an S5/S8 bearer 432) between SGW 420 and PGW 426. Various signaling bearer portions are also illustrated in FIG. 5. For example, a first signaling portion (e.g., a signaling radio bearer 448) between UE 414 and eNB 416*a*, and a second signaling portion (e.g., S1 signaling bearer 430) between eNB 416*a* and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address, and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two-tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. For example, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual basis. For example, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 6:
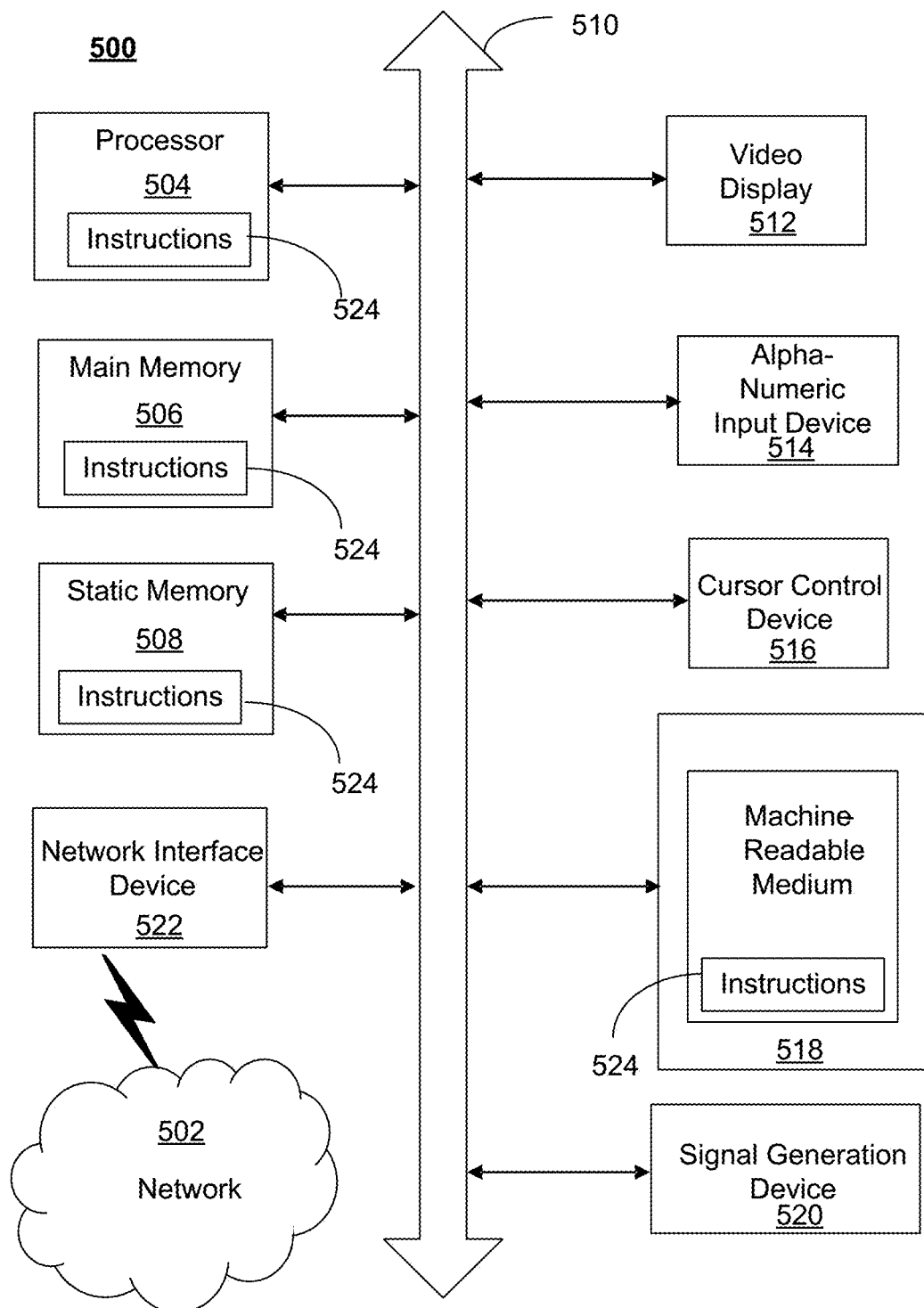
FIG. 6 depicts an exemplary communication system that provide wireless telecommunication services over wireless communication networks with which edge computing node may communicate.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1-4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 518 on which is stored one or more sets of instructions (e.g., software 524) embodying any one or more of the methods or functions described herein, including those methods illustrated above. Instructions 524 may also reside, completely or at least partially, within main memory 506, static memory 508, or within processor 504 during execution thereof by the computer system 500. Main memory 506 and processor 504 also may constitute tangible computer-readable storage media.

Figure 7:
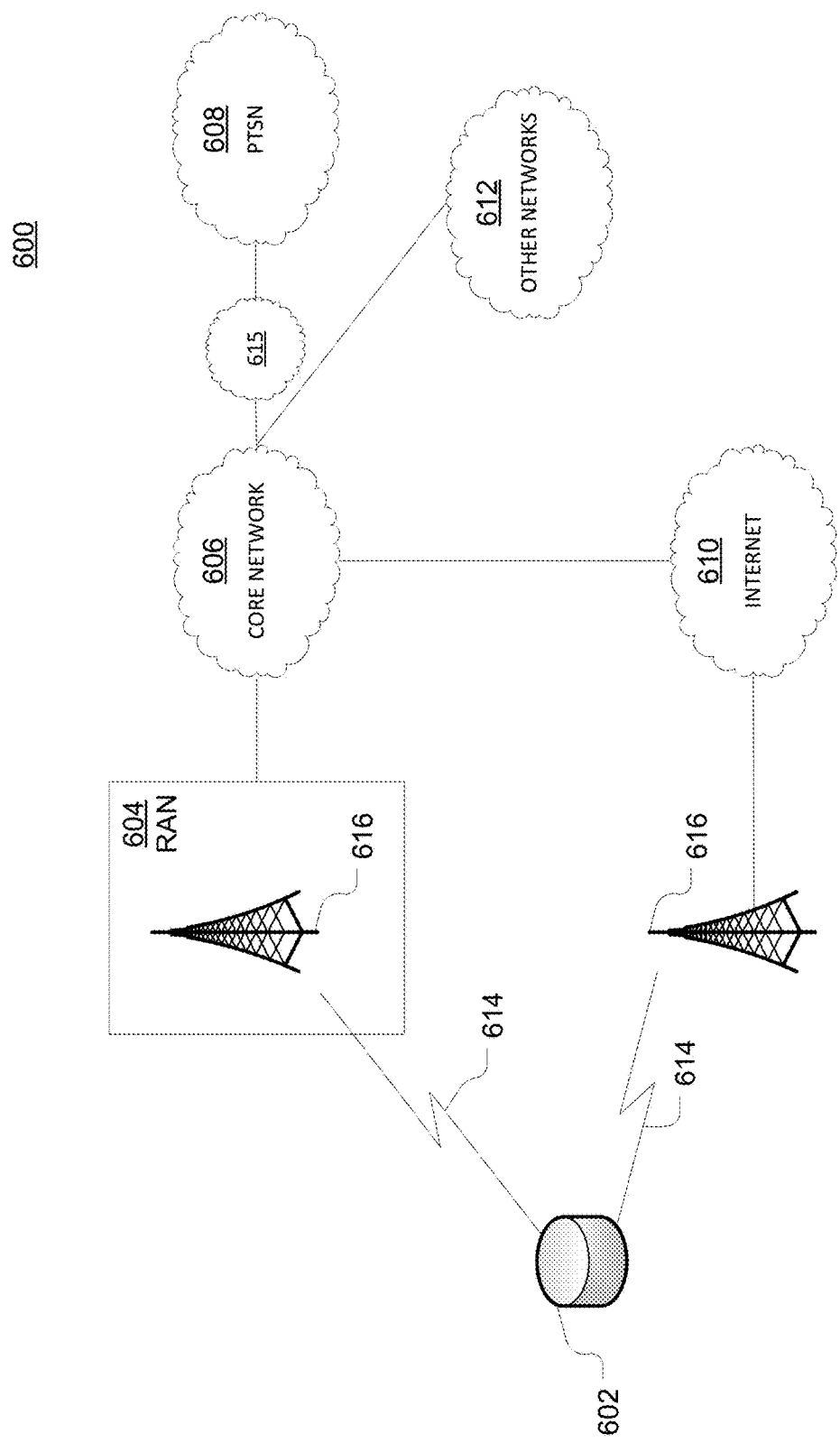
FIG. 7 is a diagram of an exemplary telecommunications system in which the disclosed methods and processes may be implemented with which edge computing node may communicate.

As shown in FIG. 7, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise IoT devices 32, mobile devices 33, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNodeB, a Home Node B, a Home eNodeB, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNodeB, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 7, base station 616 may have a direct connection to Internet 610. Thus, base station 616 may not be required to access Internet 610 via core network 606.

RAN 604 may be in communication with core network 606, which may be any type of network configured to provide voice, data, applications, or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 7, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 615 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

While examples of described telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims. In addition, the use of the word "or" is generally used inclusively unless otherwise provided herein. The steps disclosed herein (e.g., FIG. 2 or FIG. 3) may be executed on one device or distributed over a plurality of devices.

Methods, systems, and apparatuses, among other things, as described herein may provide for orchestration of temporary and modular network resources. A method, system, computer readable storage medium, or apparatus provides for receiving information associated with a plurality of user equipment, wherein the information comprises location information for each of the plurality of user equipment; receiving information associated with a plurality of base stations in proximity to the plurality of user equipment; analyzing the information associated with the plurality of user equipment or the information associated with the plurality of base stations, wherein the analysis of the information associated with the plurality of user equipment or the information associated with the plurality of base stations is historical or near real-time information that uses artificial intelligence; in response to the analysis, detecting a trigger, wherein the trigger comprises reaching one or more thresholds associated with the information associated with the plurality of user equipment or the information associated with the plurality of base stations; and based on the trigger, sending an alert to one or more of the plurality of user equipment, wherein the alert indicates a modification of a configuration of an antenna of the one or more of the plurality of user equipment, or orchestrating movement of a component of each of the plurality of base stations, movement of each of the plurality of base stations, or configuration of an antenna of the one or more of the plurality of user equipment. The information may include a wireless standard, type of antenna, type of user equipment, model of user equipment, operating system of user equipment, or minimum throughput of user equipment for each of the plurality of user equipment. The information associated with the plurality of base stations may include type of each of the plurality of base stations, available bandwidth of each of the plurality of base stations, location of each of the plurality of base stations, radio coverage of each of the plurality of base stations, component movement capability of each of the plurality of base stations, or base station movement capability of each of the plurality of base stations. The application information may include type of application, quality of service requirement of application, or minimum bandwidth threshold or preferred bandwidth threshold while using each application on each of the plurality of user equipment. The information may include application information for each of the plurality of user equipment. The movement horizontally may be when the antenna or base station move along a rail system or using wheels. The base station movement capability comprises antenna or base station movement horizontally. The component movement capability comprises antenna radial movement or vertical movement along an approximately stationary Z-axis. A subset of the plurality of base stations are drones or intent of things devices.

The invention claimed is:

1. A system comprising:
one or more processors; and
memory coupled with the one or more processors, the memory comprising executable instructions that when executed by the one or more processors cause the one or more processors to effectuate operations comprising:
receiving information associated with a plurality of user equipment, wherein the information comprises location information for each of the plurality of user equipment;
receiving information associated with a plurality of base stations in proximity to the plurality of user equipment;
analyzing the information associated with the plurality of user equipment or the information associated with the plurality of base stations, wherein the analysis of the information associated with the plurality of user equipment or the information associated with the plurality of base stations is historical or near real-time information that uses artificial intelligence;
in response to the analysis, detecting a trigger, wherein the trigger comprises reaching one or more thresholds associated with the information associated with the plurality of user equipment or the information associated with the plurality of base stations; and
based on the trigger:
sending an alert to one or more of the plurality of user equipment, wherein the alert indicates a modification of a configuration of an antenna of the one or more of the plurality of user equipment, or
orchestrating movement of a component of each of the plurality of base stations.

2. The system of claim 1, wherein the information associated with the plurality of user equipment comprises a minimum throughput of user equipment for each of the plurality of user equipment.

3. The system of claim 1, wherein the information associated with the plurality of base stations comprises base station movement capability of each of the plurality of base stations.

4. The system of claim 1, wherein the plurality of base stations comprises drones or internet of things devices.

5. The system of claim 1, wherein the movement of the component comprises antenna radial movement or vertical movement along an approximately stationary Z-axis.

6. The system of claim 1, wherein the information associated with the plurality of base stations comprises base station movement capability of each of the plurality of base stations, and wherein the base station movement capability comprises antenna or base station movement horizontally.

7. The system of claim 6, wherein the movement horizontally is when the antenna or base station move along a rail system or using wheels.

8. The system of claim 1, wherein the information associated with the plurality of user equipment comprises application information for each of the plurality of user equipment.

9. The system of claim 8, wherein the application information comprises a type of application.

10. A computer-implemented method comprising:
receiving information associated with a plurality of user equipment, wherein the information comprises location information for each of the plurality of user equipment;
receiving information associated with a plurality of base stations in proximity to the plurality of user equipment;
analyzing the information associated with the plurality of user equipment or the information associated with the plurality of base stations, wherein the analysis of the information associated with the plurality of user equipment or the information associated with the plurality of base stations is historical or near real-time information that uses artificial intelligence;
in response to the analysis, detecting a trigger, wherein the trigger comprises reaching one or more thresholds associated with the information associated with the plurality of user equipment or the information associated with the plurality of base stations; and
based on the trigger:
sending an alert to one or more of the plurality of user equipment, wherein the alert indicates a modification of a configuration of an antenna of the one or more of the plurality of user equipment, or
orchestrating movement of a component of each of the plurality of base stations.

11. The computer-implemented method of claim 10, wherein the information associated with the plurality of user equipment comprises minimum throughput of user equipment for each of the plurality of user equipment.

12. The computer-implemented method of claim 10, wherein the information associated with the plurality of base stations comprises base station movement capability of each of the plurality of base stations.

13. The computer-implemented method of claim 10, wherein the plurality of base stations comprises drones or internet of things devices.

14. The computer-implemented method of claim 10, wherein the movement of the component comprises antenna radial movement or vertical movement along an approximately stationary Z-axis.

15. The computer-implemented method of claim 10, wherein the information associated with the plurality of base stations comprises base station movement capability of each of the plurality of base stations, and wherein the base station movement capability comprises antenna or base station movement horizontally.

16. The computer-implemented method of claim 15, wherein the movement horizontally is when the antenna or base station move along a rail system or using wheels.

17. The computer-implemented method of claim 10, wherein the information associated with the plurality of user equipment comprises application information for each of the plurality of user equipment.

18. The computer-implemented method of claim 17, wherein the application information comprises a type of application.

19. A non-transitory computer-readable storage medium storing executable instructions that, when executed by a processor, cause said processor to effectuate operations comprising:
receiving information associated with a plurality of user equipment, wherein the information comprises location information for each of the plurality of user equipment;
receiving information associated with a plurality of base stations in proximity to the plurality of user equipment;
analyzing the information associated with the plurality of user equipment or the information associated with the plurality of base stations, wherein the analysis of the information associated with the plurality of user equipment or the information associated with the plurality of base stations is historical or near real-time information that uses artificial intelligence;
in response to the analysis, detecting a trigger, wherein the trigger comprises reaching one or more thresholds associated with the information associated with the plurality of user equipment or the information associated with the plurality of base stations; and
based on the trigger:
sending an alert to one or more of the plurality of user equipment, wherein the alert indicates a modification of a configuration of an antenna of the one or more of the plurality of user equipment, or
orchestrating movement of a component of each of the plurality of base stations.

20. The non-transitory computer-readable storage medium of claim 19, wherein the information associated with the plurality of base stations comprises base station movement capability of each of the plurality of base stations.

* * * * *